428-408 SR
10/27/87 XR 4,702,958

United States Patent [19]

Itoh et al.

[11] Patent Number: 4,702,958

[45] Date of Patent: Oct. 27, 1987

[54] LASER RECORDING FILM

[75] Inventors: Masanori Itoh; Fumihiko Hayashi, both of Himeji, Japan

[73] Assignee: Daicel Chemical Industries, Ltd., Japan

[21] Appl. No.: 834,271

[22] PCT Filed: Jun. 7, 1985

[86] PCT No.: PCT/JP85/00324

§ 371 Date: Jan. 23, 1986

§ 102(e) Date: Jan. 23, 1986

[87] PCT Pub. No.: WO86/00048

PCT Pub. Date: Jan. 3, 1986

[30] Foreign Application Priority Data

Jun. 11, 1984 [JP] Japan ................................ 59-119263

[51] Int. Cl.4 ......................... B32B 5/16; G01D 15/10

[52] U.S. Cl. .................................... 428/323; 428/327; 428/408; 428/480; 428/500; 430/945; 346/76 L; 346/135.1

[58] Field of Search ....................... 428/408, 323, 327; 430/945; 346/76 L, 135.1

[56] References Cited

U.S. PATENT DOCUMENTS

| | | | |
|---|---|---|---|
| 3,787,873 | 1/1974 | Sato et al. | 430/945 X |
| 4,245,003 | 1/1981 | Oransky et al. | 346/76 L X |

*Primary Examiner*—George F. Lesmes
*Assistant Examiner*—Susan S. Rucker
*Attorney, Agent, or Firm*—Birch, Stewart, Kolasch & Birch

[57] ABSTRACT

A laser recording film prepared by coating a transparent film with a recording medium comprising graphite particles at least 95% of which have a particle diameter of 2 μm or below and at least 40% of which have a particle diameter of 0.2 μm or below. Said laser recording film can provide high-resolution, heat-mode recording.

6 Claims, 6 Drawing Figures

FIG. 1
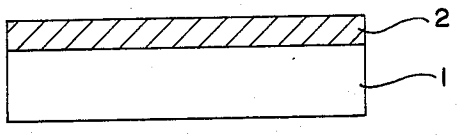
FIG. 2
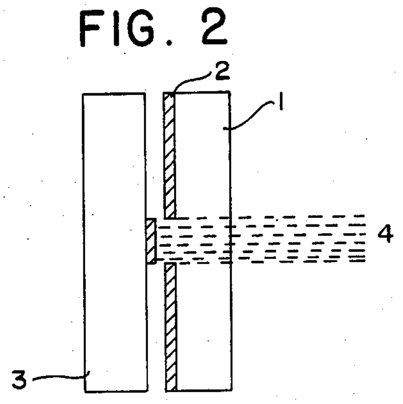
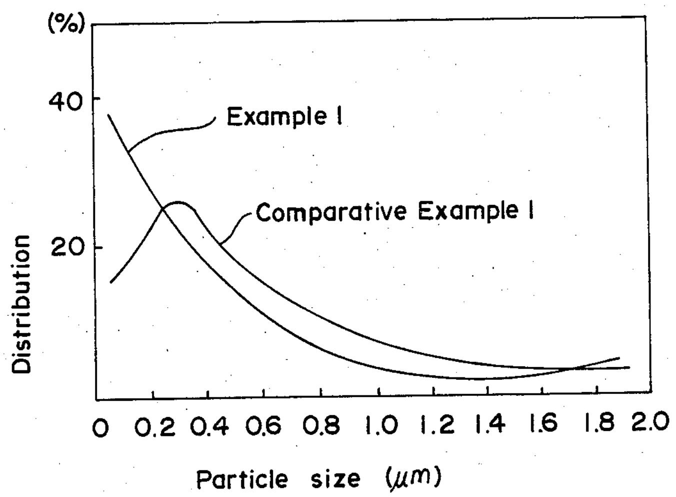
FIG. 3

FIG. 4
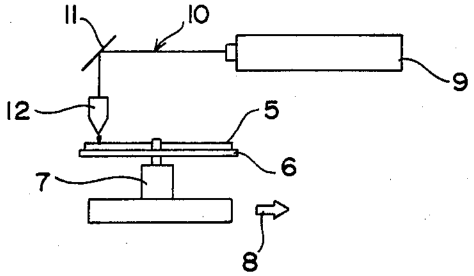
FIG. 5
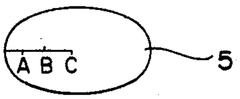
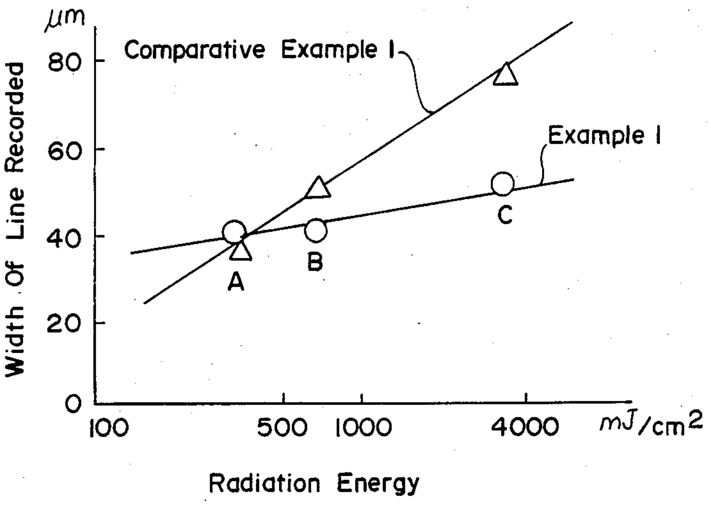
FIG. 6

LASER RECORDING FILM

FIELD OF INDUSTRIAL APPLICATION

The present invention relates to a laser recording film suitable for heat mode recording utilizing laser beams.

A recording process in which lasers are used can provide high-resolution, high-speed, high-density recording and further allow real-time writing and reading.

In this process, the power of optical energy of laser beams and their resolving power are utilized and the recording of information is performed by using a difference between the optical density of a non-image area and that of an image area which, when a strongly light-absorptive substance is irradiated with laser beams, are formed by the sublimation and evaporation of the irradiated area by the thermal energy of the laser beams.

PRIOR ART

One of the proposed laser recording films is a recording film formed by coating a transparent substrate with recording medium comprising a heat-absorptive fine particles such as carbon black and a binder (see Japanese Patent Laid-Open No. 77780/1971). In this film, the recording is performed by a difference between the density of a non-imaged area and that of an imaged area formed by evaporating fine carbon black particles by irradiation with high intensity lights.

Further, a recording film coated with a recording medium comprising heat-absorptive fine particles such as carbon black and a self-oxidizable binder such as nitrocellulose is proposed (see Japanese Patent Laid-Open No. 43632/1973). In this recording film, the recording of positive and negative images becomes possible by transferring, for example, fine carbon black particles to another recording tape by irradiation with laser beams.

In the above laser recording films, the recording is performed by irradiating a recording medium comprising heat-absorptive particles such as carbon black and a binder with laser beams to form a difference between the optical densities on the film by combustion or ejection.

The resolving power of a laser recording film of such a system depends on the film thickness and lowoutput, high-density, high-resolution recording can be performed when a thin film is used.

When the coated film is thin, however, the optical density itself of a non-irradiated area is decreased and rise is given to a problem at the time of, for example, reading of recorded information. Namely, in the case of heat mode laser recording, carbon black, graphite, or the like are used as the heat-absorptive particles, and the optical density is decreased when these particles are coated to form a thin film, which causes a decrease in resolving power or in the difference between the optical density of an image area and that of a non-image area.

When the amount of the added heat-absorptive particles such as carbon black is increased, the difference in optical density can be increased but the adhesive strength of a coated film to a base, the dispersion stability of a coating solution, etc., are worsened. Therefore, the amount of the particles added has been limited.

DISCLOSURE OF THE INVENTION

As a result of extensive studies to eliminate these problems, the inventors of the present application have developed a high-optical density, high-resolution, high-sensitivity laser recording film leading to the present invention.

Namely, the present invention provides a laser recording film which can be prepared by coating a transparent film with a recording medium comprising graphite particles at least 95% of which have a particle diameter of 2 μm or below and at least 40% of which have a particle diameter of 0.2 μm or below and a binder.

BRIEF DESCRIPTION OF DRAWINGS

FIG. 1 is a sectional view of a laser recording film of the present invention, FIG. 2 is a schematic sectional view of a recorder in which a film of the present invention is used, and FIG. 3 is a diagram of the particle diameter distribution of graphite particles used in Example 1 and Comparative Example 1.

In the drawings element 1 is a transparent film; element 2 is a recording medium; element 3 is a transferred image receiving body; and element 4 are the laser beams.

FIG. 4 is a schematic view of an apparatus for determining the relationship between the line width of a recording and the laser radiation energy;

FIG. 5 is a diagram showing positions of measurement of the line widths of recordings obtained; and FIG. 6 is a diagram showing the relationship between the line width of a recording and the magnitude of the radiation energy.

5 Element is a sample film;

6 Element is a rotary disc;

7 Element is a rotating motor; and

9 Element is a ND:YAG laser (A laser in which Y is yttrium, A is aluminum, G is garnet and Nd is a dutant. It is a well known solid laser source such as disclosed in U.S. Pat. No. 4,245,003.)

The structure of the laser recording film of the present invention is as shown in FIG. 1, and it is formed by coating a laser beam transmitting transparent film 1 with a recording medium 2 comprising graphite as heat-absorptive particles which can impact a high optical density and a binder.

The recording is performed in the following way. As shown in FIG. 2, laser beams 4 collimated by passing through an ordinary lens system and a collimating device are applied by scanning from the side of a transparent film 1, and the recording medium 2 is evaporated and attached to the image receiving surface of a transferred image receiving body 3 to record an image. It is preferable that the image receiving surface is mounted in contact with the recording medium 2, and the resolving power can be further enhanced by improving adhesion therebetween by application of a vacuum.

According to this process, it is possible to obtain positive and negative images by a single operation. The negative image can be used in, for example, the production of a synthetic resin printing plate and miniature copy films, etc., and the positive image can be used as a proof copy or a direct printing plate.

The film thickness of the recording medium is usually 2 μm or below, desirably 0.2 to 2 μm, more desirably 0.2 to 1.0 μm, and particularly 0.2 to 0.7 μm. In the recording medium with which the transparent film is coated, the proportion of graphite added is 1 to 90% by weight, based on the total amount of graphite and a binder, but an amount of 50–85% by weight is usually preferred.

The binders which can be used include acrylic resins such as polymethyl methacrylate and polymethyl acrylate, cellulose derivatives such as ethylcellulose, nitrocellulose, and cellulose acetate butyrate, phenolic resins, polyvinyl chloride, and vinyl chloride/vinyl acetate copolymers.

The transparent films may be any one that can transmit laser beams, and polystyrene and polyethylene terephthalate films can be mentioned as examples.

The above-mentioned laser recording film of this invention having graphite of a specified particle diameter has good adhesion of a support film to a recording medium, a high light-screening property and a high resolving powder.

BEST MODE FOR CARRYING OUT THE INVENTION

The present invention will now be described with reference to examples.

EXAMPLE 1

A 75 μ-thick polyester film was coated by means of a bar coater with a graphite dispersion containing graphite having a particle diameter distribution shown in FIG. 3 and having the following formulation (Formulation 1), and the coated dispersion was dried to form a recording layer. When this recording film was irradiated with YAG laser (wavelength of 1060 nm, output of 10 W, 0.5 J/cm$^2$ on the recording medium), an image was transferred to the receiving body. The variation in the optical transmission density with a film thickness is shown in Table 1 (ultraviolet region) and Table 2 (visible region).

The optical transmission density is the logarithm of a ratio of the intensity of incident light to that of transmitted light.

(FORMULATION 1)

graphite: 100 parts
ethylcellulose: 36 parts
ethyl acetate: 1224 parts.

COMPARATIVE EXAMPLE 1

A 75 μ-thick polyester film was coated by means of a bar coater with a graphite dispersion containing graphite of a particle diameter distribution shown in FIG. 3 and having the following formulation (Formulation 2), and the coated dispersion was dried to form a recording layer. When this recording film was irradiated with YAG laser (wavelength of 1060 nm, output of 10 W, 0.5 J/cm$^2$ on the recording medium), an image was transferred to the receiving body.

In the same manner as in Example 1, the variation in the optical transmission density with a film thickness is shown in Tables 1 and 2.

(FORMULATION 2)

graphite: 100 parts
ethylcellulose: 24 parts
isopropyl alcohol: 1164 parts.

TABLE 1

| Dry film thickness (μm) | Optical transmission density (Ultraviolet region) Ex. 1 | Comp. Ex. 1 |
|---|---|---|
| 0.30 | 2.0 | 1.9 |
| 0.35 | 2.7 | 2.2 |
| 0.40 | 3.5 | 2.5 |
| 0.45 | 4.5 | 2.9 |

TABLE 2

| Dry film thickness (μm) | Optical transmission density (Visible region) Ex. 1 | Comp. Ex. 1 |
|---|---|---|
| 0.30 | 1.5 | 1.4 |
| 0.35 | 1.9 | 1.6 |
| 0.40 | 2.4 | 1.9 |
| 0.45 | 3.1 | 2.3 |

The relationship between the line width of a recording and the laser radiation energy was determined by the following method on the recording films obtained in Example 1 and Comparative Example 1.

(METHOD OF MEASUREMENT)

A measuring device shown in FIG. 4 was used. A sample film 5 was put on a rotary disc 6 and irradiated with beams of Nd:YAG laser 9 of a 50 μm-diameter from the side of the transparent film in a direction of an arrow 10 while it was being rotated. Reference numeral 11 refers to a mirror and 12 to an objective. At this time, the rotary disc 6 was moved along a single axis indicated by an arrow 8 by means of a motor running at a constant speed to perform a spiral recording on the sample film. FIG. 5 shows radiation energy and the positions of measurement of the line widths of the obtained recordings. A is a peripheral portion, B is an intermediate portion, and C is a center position. FIG. 6 shows the results of the measurements. It shows that the film of the present invention could give a line width of a recording which was stable to changes in radiation energy.

What is claimed is:

1. A laser recording film prepared by coating a transparent film with a recording medium comprising graphite particles, at least 95% of which have a particle diameter of 2 μm or below and at least 40% of which have a particle diameter of 0.2 μm or below and a binder.

2. The laser recording film as defined by claim 1, wherein the thickness of the recording medium is 0.2 to 2 μm.

3. The laser recording film as defined by claim 1, wherein thickness of the recording medium is 0.2 to 0.7 m.

4. The laser recording film as defined by claim 1, wherein the graphite particles are present in an amount of 50–85% by weight based upon the total amount of graphite and binder.

5. The laser recording film as defined by claim 1, wherein the binders include acrylic resins such as polymethyl methacrylate and polymethyl acrylate, cellulose derivatives such as ethylcellulose, nitrocellulose, and cellulose acetate butyrate, phenolic resins, polyvinyl chloride, and vinyl chloride/vinyl acetate copolymers.

6. The laser recording film as defined by claim 1, wherein the transparent film is selected from the group consisting of polystyrene and polyethylene terephthalate.

* * * * *